(12) United States Patent
Roup et al.

(10) Patent No.: US 10,538,340 B1
(45) Date of Patent: Jan. 21, 2020

(54) MOBILE UAV LAUNCH AND RETRIEVAL SYSTEM FOR OPERATION WITHIN A TRANSPORTATION SYSTEM

(71) Applicant: Rockwell Collins, Inc., Cedar Rapids, IA (US)

(72) Inventors: Alexander V. Roup, Centreville, VA (US); Joshua R. Bertram, Ames, IA (US); Brian R. Wolford, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 372 days.

(21) Appl. No.: 15/467,366

(22) Filed: Mar. 23, 2017

(51) Int. Cl.
| | | |
|---|---|---|
| *B64F 1/02* | (2006.01) | |
| *B64C 39/02* | (2006.01) | |
| *B64F 1/04* | (2006.01) | |
| *G08G 5/00* | (2006.01) | |
| *B64F 1/28* | (2006.01) | |
| *B64F 1/22* | (2006.01) | |

(Continued)

(52) U.S. Cl.
CPC ............... *B64F 1/02* (2013.01); *B60L 53/60* (2019.02); *B60L 53/80* (2019.02); *B61D 3/16* (2013.01); *B61L 25/021* (2013.01); *B61L 25/025* (2013.01); *B64C 39/024* (2013.01); *B64F 1/04* (2013.01); *B64F 1/22* (2013.01); *B64F 1/28* (2013.01); *G08G 5/0034* (2013.01); *G08G 5/0091* (2013.01); *B64C 2201/08* (2013.01); *B64C 2201/141* (2013.01); *B64C 2201/146* (2013.01); *B64C 2201/18* (2013.01); *B64C 2201/205* (2013.01); *B64C 2201/208* (2013.01)

(58) Field of Classification Search
CPC .......... B64C 2201/08; B64C 2201/182; B64C 2201/208; B64C 2201/205; B64C 2201/201; B64F 1/04; B64F 1/22
See application file for complete search history.

(56) References Cited

U.S. PATENT DOCUMENTS

| | | |
|---|---|---|
| 7,610,122 B2 | 10/2009 | Anderson |
| 9,139,310 B1 | 9/2015 | Wang |

(Continued)

FOREIGN PATENT DOCUMENTS

WO      2016053746 A1      4/2016

*Primary Examiner* — Philip J Bonzell
*Assistant Examiner* — Tye William Abell
(74) *Attorney, Agent, or Firm* — Suiter Swantz pc llo

(57) ABSTRACT

Systems for mobile launch and retrieval of unmanned aircraft systems (UAS) include a rail-based, ground-based, or water-based mobile platform carrying a mobile station for launching and retrieving vertical take-off and landing (VTOL) or non-VTOL UAS while the platform is in motion, based on current position and weather conditions. The mobile platform may include facilities for communicating with the airborne UAS, stowing a retrieved UAS, and reloading/refitting a stowed UAS. The mobile platform may include positionable wake control devices and a partially positionable launch and retrieval mechanism for alleviating turbulence or crosswinds. The mobile platform may include long-range sensors for detecting or identifying obstacles near a rail-based platform that may interfere with the operating envelope of the launch and retrieval mechanisms. The launch and retrieval system may be intermodal and scalable either up or down as mission parameters demand.

20 Claims, 4 Drawing Sheets

(51) Int. Cl.
  *B61D 3/16*   (2006.01)
  *B61L 25/02*  (2006.01)
  *B60L 53/80*  (2019.01)
  *B60L 53/60*  (2019.01)

(56) References Cited

U.S. PATENT DOCUMENTS

| | | |
|---|---|---|
| 9,305,280 B1 | 4/2016 | Berg et al. |
| 9,387,928 B1 | 7/2016 | Gentry et al. |
| 9,718,564 B1 * | 8/2017 | Beckman ............ G06Q 10/0832 |
| 9,783,321 B1 * | 10/2017 | Bassler ..................... B64F 1/04 |
| 2014/0172194 A1 | 6/2014 | Levien et al. |
| 2015/0266575 A1 * | 9/2015 | Borko ................... B64C 39/024 |
| | | 701/3 |
| 2016/0144734 A1 | 5/2016 | Wang et al. |
| 2016/0196756 A1 | 7/2016 | Prakash et al. |
| 2016/0200438 A1 | 7/2016 | Bokeno et al. |
| 2017/0096222 A1 * | 4/2017 | Spinelli ................ B64C 39/024 |
| 2018/0265295 A1 * | 9/2018 | Beckman ............. G08G 5/0069 |
| 2018/0295327 A1 * | 10/2018 | Yearwood ............. B64C 39/024 |

\* cited by examiner

MOBILE UAV LAUNCH AND RETRIEVAL SYSTEM FOR OPERATION WITHIN A TRANSPORTATION SYSTEM

BACKGROUND

Existing usage of unmanned aircraft systems (UAS) in conjunction with a transportation network or system is constrained by several factors. Among these are the cost of UAS with sufficient range and endurance to cover a transportation system, lack of terrestrial Command and Control (C2) communications systems, and regulatory hurdles for beyond line-of-sight (LOS) operation of a UAS. For example, a transportation system may need surveillance capability to inspect and monitor the condition of infrastructure elements, monitor the overall system status to verify nominal operation, and monitor for security threats. Road- or rail-based transportation systems, for example, tend to have long linear routes with a small area footprint distributed over long distances. Similarly, a road-based or rail-based system are examples of a transportation system technologically constrained to the boundaries of its network. While UAS air vehicles may expand the coverage area of such a network, small UAS (sUAS) vehicles have limited range; fixed launch and recovery based installations may require a prohibitive amount of assets to effectively serve the network. However, an increase in UAS vehicle range requires substantial increases to the size and overall mass of the vehicle. These increases lead in turn to proportional increases in cost, but also complicate the ability to operate more massive UAS vehicles (e.g., greater than 300 lb≈136 kg) within the civil national airspace system (NAS). Similarly, operating a UAS vehicle beyond visual/LOS range may require enhanced C2 or payload data communication infrastructure throughout the entirety of the transportation system; satellite communications systems, for example, may be too bulky or expensive for use with sUAS vehicles to be feasible.

SUMMARY

In one aspect, embodiments of the inventive concepts disclosed herein are directed to a launch and retrieval system for unmanned aircraft systems (UAS) operating in conjunction with a transport network traversed by a mobile platform (e.g., a rail network, highway, or coastal/shore area surveyed by ship) and a network of unmanned aerial vehicles (UAV) operating within the transport network, e.g., for surveillance or delivery purposes. The system may include a launch and retrieval (L/R) mechanism mountable to a mobile platform (such as a ship, truck or other ground vehicle, or one or more railcars) and having a defined operating envelope. The L/R mechanism may include a mechanism for capturing an inbound UAS, e.g., either a vertical takeoff and landing (VTOL) UAV or a conventional non-VTOL UAV, located within the operating envelope. The L/R mechanism may include a mechanism for launching or releasing an outbound UAS (e.g., for surveillance or delivery activities) at a desired heading and airspeed. The L/R system may include a command and control system including sensors for determining wind speed and direction as well as the current position, velocity, or heading of the mobile platform (e.g., traveling south at 40 mph). The command and control system may include communications equipment for transmitting and receiving data to and from airborne UAS, e.g., to exchange position and wind data so an inbound UAS may position itself within the operating envelope for capture. The command and control system may include an onboard or remote control station whereby the L/R mechanism may be activated by an operator based on available data. The control station may include memory for storing UAS flight plans and processors for modifying flight plans or, based on wind conditions and the weight of an outbound UAS, the optimal heading and launch velocity of the outbound UAS may be determined. The control station may include a display unit for displaying to the operator current conditions and position data for the mobile platform and airborne UAS.

In a further aspect, embodiments of the inventive concepts disclosed herein are directed to a rail-based L/R system for a network of UAS operating in conjunction with a rail network. The L/R system may include one or more railcars for traversing the rail network. The L/R system may include a L/R mechanism mounted aboard the railcar and having an operating envelope. The L/R mechanism may include a mechanism for capturing an inbound, or returning, UAS flying alongside the mobile platform within the operating envelope at a given heading and airspeed. The L/R mechanism may include a mechanism for launching or releasing an outbound UAS at a given heading and airspeed. The L/R system may include a command and control system (either mounted to the railcar or remotely located) via which the L/R mechanisms may be operated by a user or autonomously. The command and control system may include sensors for determining wind speed and direction aboard the railcar, as well as position, velocity, and heading data of the railcar. The command and control system may include long-range sensors for detecting obstacles or terrain proximate to the tracks which may interfere with the operation of the L/R mechanism. The command and control system may include communications equipment for transmitting and receiving data to and from airborne UAS, including flight data, wind conditions, and position data of the railcar. The command and control system may include a control station for receiving input from the user and controlling the launch and retrieval mechanisms based on the received input. The control station may include memory for storing the flight plans of operating or outbound UAS and processors for modifying the flight plans and determining, based on current conditions and the weight of an outbound UAS, the optimal velocity and heading at which to release the outbound UAS. The control station may include a display unit for displaying current position data, flight data, and wind conditions to the operator or user.

In a still further aspect, embodiments of the inventive concepts disclosed herein are directed to an intermodal L/R system for UAS operating in conjunction with a transport network. The intermodal L/R system may be contained within one or more intermodal containers capable of being shipped to a staging area (e.g., via rail, ground, or ship) at which the L/R system may be mounted aboard a mobile platform (a truck, one or more railcars, or a ship) for operations. The intermodal L/R system may include an L/R mechanism having an operating envelope surrounding the mobile platform. The L/R mechanism may include a mechanism for capturing an inbound, or returning, UAS flying alongside the mobile platform within the operating envelope at a given heading and airspeed. The L/R mechanism may include a mechanism for launching or releasing an outbound UAS at a given heading and airspeed. The L/R system may include a command and control system via which the L/R mechanisms may be operated manually or with some degree of autonomy. The command and control system may include sensors for determining wind speed and direction aboard or proximate to the mobile platform, as well as position, velocity, and heading data of the mobile platform. The command and control system may include communications equipment for transmitting and receiving data to and from airborne UAS, including flight data, wind conditions, surveillance or operations data, and mobile platform position data. The command and control system may include a control station for receiving input from the operator and controlling the launch and retrieval mechanisms based on the received input. The control station may include memory for storing the flight plans of operating or outbound UAS and processors for modifying the flight plans and determining, based on current conditions and the weight of an outbound UAS, the optimal velocity and heading at which to release the outbound UAS. The control station may include a display unit for displaying current position data, flight data, and wind conditions to the operator.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
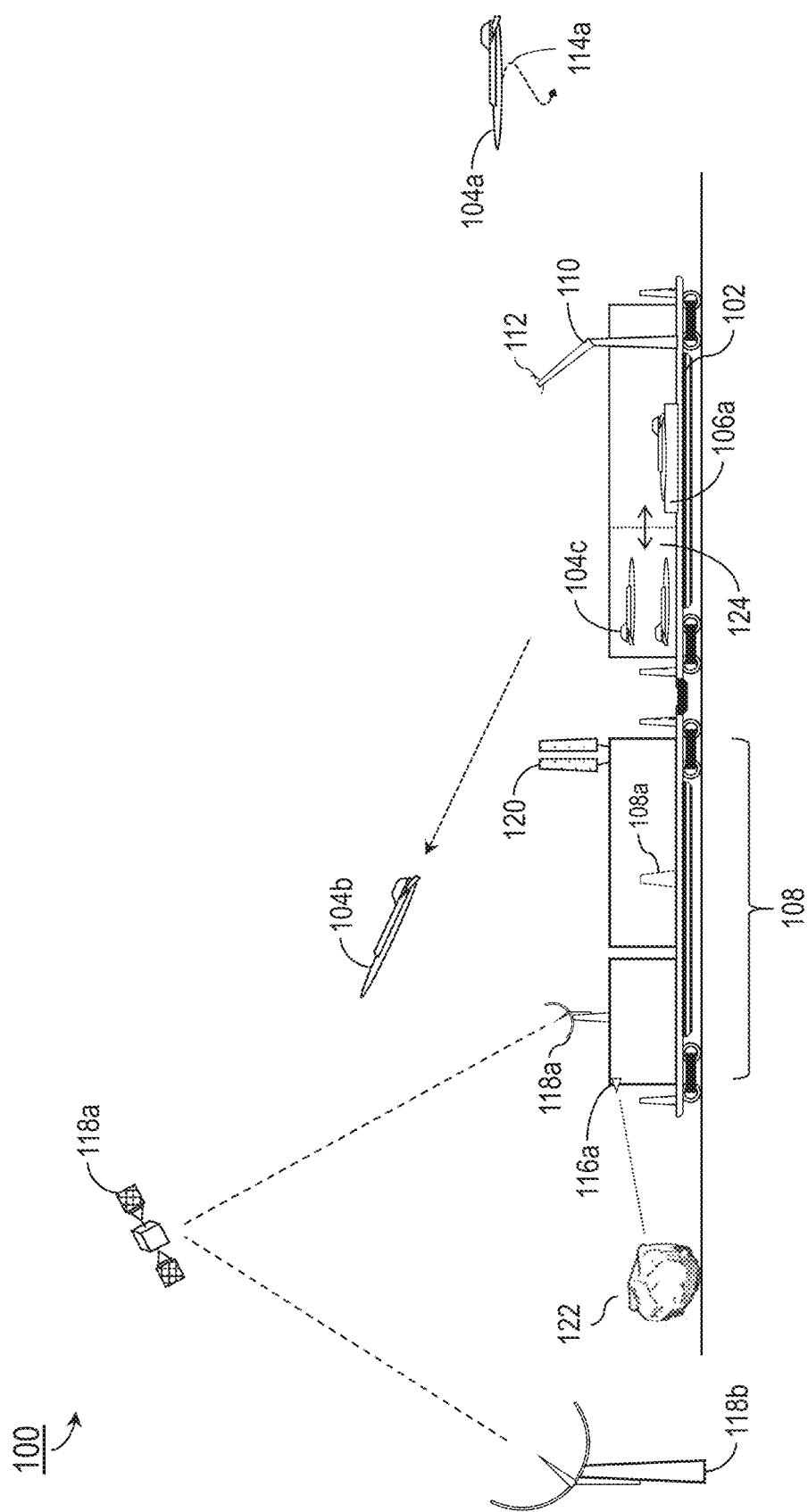
FIG. 1 illustrates an exemplary embodiment of a rail-based UAS launch and retrieval system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to systems for mobile launch and retrieval systems for networks of unmanned aerial systems (UAS) operating within a transport network. The systems disclosed herein may provide mobile and intermodal infrastructure for the support of UAS serving large transport networks in, e.g., a surveillance or pickup/delivery capacity, where fixed infrastructure may not otherwise exist or may be prohibitively expensive to provide and maintain. The mobile platforms may be ground-based or water-based, and able to launch and retrieve non-VTOL, non-hovering UAS while in motion, operating under remote control or autonomously in conjunction with mission-specific networks of autonomous machines.

Figure 2:
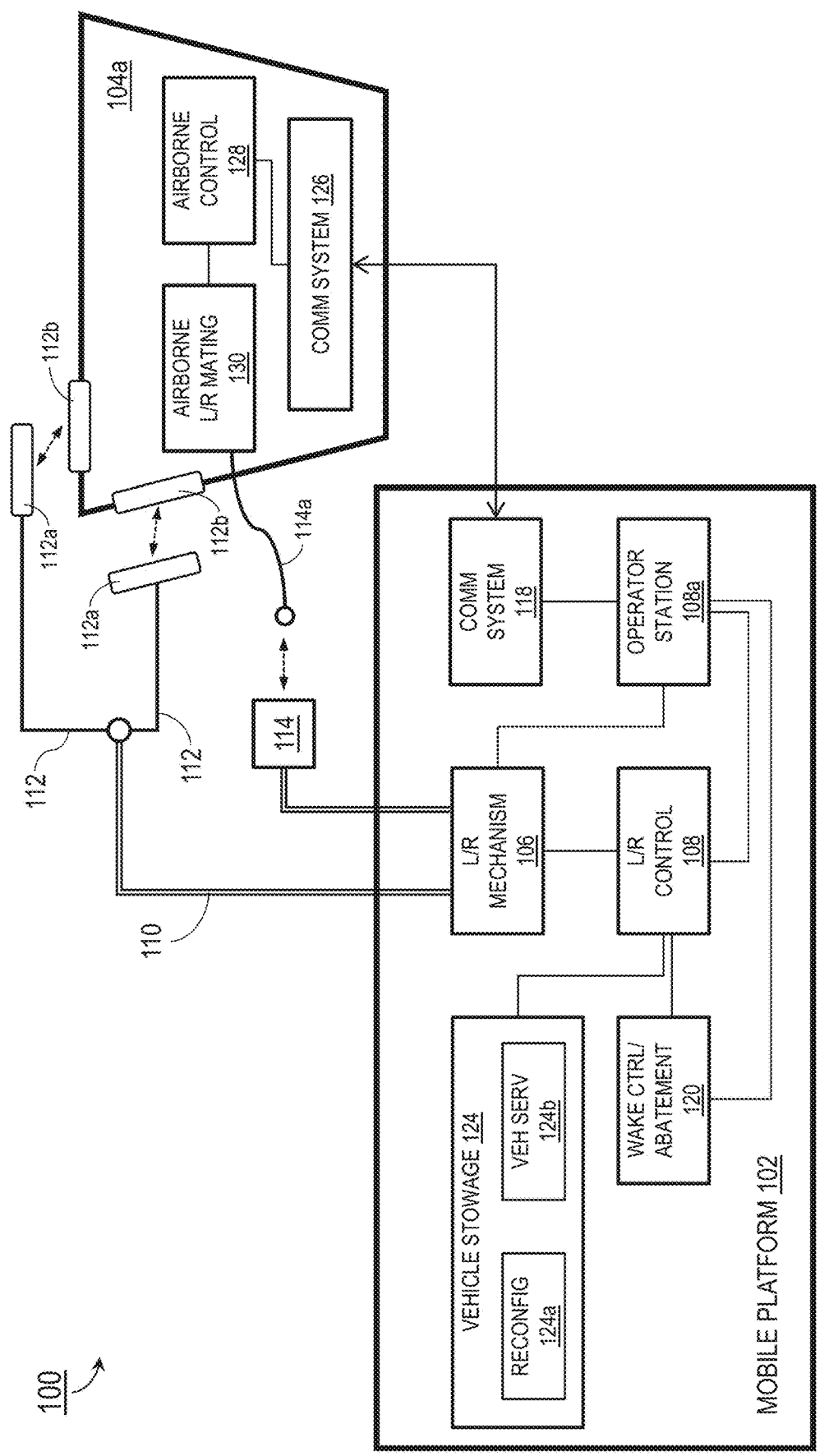
FIG. 2 illustrates components of the system of FIG. 1.

Referring now to FIGS. 1 and 2, an exemplary embodiment of a mobile launch and retrieval (L/R) system 100 for according to the inventive concepts disclosed herein unmanned aerial systems (UAS) operating within an environment corresponding to a transport network may include one or more railcars (102) or a similar mobile platform (e.g., a truck or other ground-based vehicle; a ship, barge, or other seagoing or littoral vehicle; a dirigible or airborne vehicle) for traversing the transport network and one or more UAS 104*a-b*, e.g., for monitoring or inspection of the transport network or the surrounding environment. For example, the UAS 104*a-b* may include onboard cameras or other sensors for the inspection of rails and other infrastructure proximate to the railcars 102, using the system 100 as a mobile base of operations as the surrounding environment may not otherwise provide the necessary infrastructure to support unmanned vehicles of optimal weight and limited range. Alternatively, the railcars 102 may leave a warehouse or depot stocked with cargo to deliver to various destinations along the rail network; the individual packages may be delivered by UAS 104*a-b* to destinations proximate to, but not necessarily adjacent to, the rail line (e.g., within UAS range of the rail line). Said destinations may additionally be remote enough so that delivery via UAS may be the most cost-effective option; the UAS 104a-b may retrieve outbound packages from delivery destinations and other points proximate to the rail line to which the UAS may be directed, returning said outbound packages to the railcars 102 for deposit at a destination warehouse or shipping facility.

The system 100 may include launch and retrieval mechanisms (106) for capturing and releasing the UAS 104a-b. For example, an outbound UAS 104b may be launched by the L/R mechanisms 106 to fulfill mission objectives according to its flight plan, after which it may return to the system 100 (or to another proximate system, if the system 100 has moved out of range) as an inbound UAS 104a. If the inbound UAS 104a is a vertical takeoff and landing (VTOL) vehicle with hovering capabilities, the inbound UAS 104a may match its heading and speed to that of the railcars 102 and land on a landing platform (106a). If the inbound UAS 104a is a non-VTOL aerial vehicle, however, the inbound UAS 104a may match the speed and heading of the railcars 102 and maneuver into the operating envelope where the L/R mechanisms 106 may guide or direct the inbound UAS to the landing platform 106a, whereby the inbound UAS may be secured by, e.g., passive perching landing gear. The operating envelope of the system 100 may be defined as the area proximate to the L/R mechanisms 106 within which the L/R mechanisms 106 may physically engage with an inbound UAS 104a, securing the inbound UAS 104a to the railcars 102 (or other mobile platform on which the system 100 is based). In some embodiments the non-VTOL UAS 104a-b are capable of achieving a minimum flight airspeed approximately 5 NM ("knots") less than the ground speed of the railcars 102; assuming no wind, the non-VTOL UAS 104a-b may hover with respect to the railcars 102. The inbound UAS 104a may be guided into close formation flight (accounting for turbulence associated with the speed of the railcars 102, surface winds, or terrain adjacent to the railcars) within the operating envelope of the L/R mechanisms 106 by a manual operator using an onboard camera of the inbound UAS, or the inbound UAS 104a may operate with partial or full autonomy and may navigate into the operating envelope based on updated position data of the railcars 102 received from a command and control system 108 of the system 100.

The L/R mechanisms 106 may include a robotic arm 110 having a range that may define the operating envelope, and including end effectors 112 for engaging with an inbound UAS 104a that has matched the speed and heading of the railcars 102 at a close-formation position within the operating envelope. It is contemplated that the robotic arm 110 and end effectors 112 may be capable of a position bandwidth of 1 Hz or less. For example, the robotic arm 110 may traverse some or all of the longitudinal axis of the railcar 102, allowing sufficient time during a capture event to eliminate any relative positioning error between the robotic arm and the inbound UAS 104a, before engaging with the inbound UAS 104a. The robotic arm 110 and end effectors 112 may implement a Vernier control strategy to achieve higher relative positioning bandwidth, whereby the robotic arm 110 is responsible for large-amplitude motion and low-frequency end effector positioning, and the end effectors 112 are responsible for small-amplitude motion and high-frequency effector positioning. The end effectors 112 may be active end effectors configured to grasp or otherwise engage a dedicated retrieval mechanism of the exterior fuselage of the inbound UAS 104a. The end effectors 112 may be passive end effectors incorporating a retrieval mechanism with which the inbound UAS 104a actively engages. In some embodiments, the end effectors 112 and inbound UAS 104a engage with each other via magnetic latching (via magnets 112a-b). In some embodiments, the L/R mechanisms 106 may include a winch 114 for grasping or engaging a cable (114a) or tether released by the inbound UAS 104a. The winch 114 may guide or direct the inbound UAS 104a onto the landing platform 106a via the cable 114a.

The inbound UAS 104a may include an onboard navigation incorporating GPS-aided (georeferenced) navigation and high-integrity relative navigation measurements and monitoring, e.g., the absolute position, velocity, attitude/rotational orientation, heading, angular rates, and accelerations of the inbound UAS 104a. Additional sensors, either onboard the inbound UAS 104a or incorporated into the command and control system 108, may augment the onboard navigation system via, e.g., real time kinematic (RTK) satellite-based position data, time of flight radio ranging, radar, lidar, and image-based navigation. For example, navigation cameras or lidar sensors positioned on the railcar 102 may determine a position of the inbound UAS 104a relative to the L/R mechanisms 106; the relative position may be transmitted to the inbound UAS 104a and used for flight path corrections or used by the L/R mechanisms 106 to position its components to intercept the inbound UAS 104a. For example, the inbound UAS 104a may use its relative positioning sensors to provide feedback loop closure for its approach to, and retrieval by, the L/R mechanisms 106 by approaching the railcars 102 at a heading parallel to its original launch trajectory. The approach procedure of the inbound UAS 104a may provide for approaching the railcars 102 at a heading parallel to the longitudinal axis of the railcars, maximizing the railcar space available for capturing the inbound UAS (e.g., if the velocity of the inbound UAS relative to the railcars is nonzero). If the inbound UAS 104a is approaching the railcars 102 at an angle relative to the longitudinal axis of the railcars (e.g., the heading of the railcar itself), the L/R mechanisms 106 may reposition, articulate, or rotate some or all of its components (e.g., the robotic arm 110 or end effectors 112) to intercept and engage the inbound UAS, e.g., into a prevailing wind rather than against a crosswind. It is contemplated that the inbound UAS 104a is sufficiently maneuverable to compensate on the fly, either via remote, semiautonomous, or fully autonomous operation, for a moderate amount of turbulence due to surface winds or proximate natural/manmade features, so as to maintain stable close formation flight during retrieval/capture operations. It is further contemplated that the inbound UAS 104a can maintain sufficient structural integrity to withstand multiple launch and retrieval cycles, as well as the corresponding mission-specific flight activities, without the need for maintenance or repair beyond that provided by the system 100 aboard the railcars 102.

The L/R mechanisms 106 may include a catapult-type launch mechanism for launching an outbound UAS 104b into flight, whereby the outbound UAS may engage its flight plan and fulfill any associated mission objectives before returning to the system 100 or another proximate system. The launch mechanism may require sufficient power to propel the outbound UAS 104b with sufficient velocity (relative to the L/R mechanism 106 or to the railcars 102) to achieve minimum airspeed based on the current windspeed and direction, as well as the weight (and distribution thereof) aboard the outbound UAS 104b. For example, the landing platform 106a may also serve as a launch platform whereby the outbound UAS 104b is prepared for flight or a retrieval platform to which the inbound UAS 104a may be secured after capture. The landing platform 106a may determine the weight and weight distribution aboard the outbound UAS 104b, sending this information to the command and control system 108 which may determine, based on the current windspeed and direction and the current heading of the railcars 102, the optimal trajectory and airspeed at which to launch the outbound UAS 104b.

The command and control system 108 may include communications equipment (118) via which the system 100 communicates with the inbound and outbound UAS 104a-b. For example, the communications equipment 118 may include transmitters for sending sensor data to an inbound UAS 104a or a modified flight plan to an outbound or airborne UAS 104b, and receivers for receiving sensor or position data from an inbound UAS 104a or operations data from an airborne or outbound UAS 104b. The communications equipment 118 may be capable of long-range or satellite-based communications (118a), e.g., for beyond line of sight operations or communications with a remote operator or operations center (118b). The command and control system 108 may include a control station (108a) which may be located onboard the railcars 102 or located remotely, e.g., at an operations center. The control station 108a may allow an operator to manually control the L/R mechanisms 106 based on displayed sensor data (e.g., from the railcars 102 as well as the inbound UAS 104a), launching outbound UAS 104b and capturing inbound UAS 104a. If the control station 108a is remotely located from the railcars 102, the operator may wirelessly control the L/R mechanisms 106 via long-range communications 118a. In some embodiments, the system 100 may operate with partial or full autonomy; sensor fusion and launch/retrieval operations may be controlled by a partially or fully autonomous onboard controller. For example, if the ground speed of the railcars 102 is too low for the inbound UAS 104a to maintain close formation at minimum airspeed, the operator may transmit a request, via the communications equipment 118, to increase the ground speed.

The system 100 may include wake control devices 120 for alleviating or eliminating turbulence from the operating envelope of the L/R mechanisms 106 due to the motion of the railcars 102 or prevailing wind conditions. The wake control devices 120 may include any appropriate configuration of grids, screens, flow control vanes, spoilers, wings, and windshields. The wake control devices 120 may be partially or fully positionable or rotatable by the control station 108a, e.g., to accommodate a non-parallel approach by an inbound UAS 104a (or a corresponding rotation/reposition of the L/R mechanisms 106 in anticipation of a non-parallel approach).

The navigation cameras/lidar sensors mounted to the railcars 102 may include forward-mounted long-range sensors (116) for monitoring and identifying natural or man-made obstacles (122) proximate to the tracks which may potentially encroach upon the operating envelope or otherwise interfere with the operations of the L/R mechanisms 106. The forward long-range sensors 116 may additionally detect other trains on the current track or adjacent tracks, which may affect the use of the L/R mechanisms 106. In some embodiments, the command and control center may determine by other means, e.g., based on the georeferenced position of the railcars 102 or messages from the operations center 118b, that the system 100 is approaching a densely populated area and may cease or scale down operations of the L/R mechanisms 106 accordingly. The command and control system 108 may include a current database of known obstacles and their positions, against which potential obstacles may be confirmed; if the forward long-range sensors 116 identify unknown or new obstacles, their locations and other characteristics (e.g., dimensions, compositions, images) may be added to the obstacle database and forwarded to other systems or the operations center 118b for incorporation into subsequent flight plans.

The L/R mechanisms 106 may include a UAS stowage facility 124 for storage of inactive UAS 104c. For example, an inactive UAS 104c may include any UAS of the system 100 not yet deployed by the L/R mechanisms 106 or recently recovered by the L/R mechanisms 106 after a completed mission. The UAS stowage facility 124 may include partially or fully enclosed storage space for protecting the inactive UAS 104c from the elements. The UAS stowage facility 124 may include conveyors, robotic arms, or other similar means of moving inactive UAS 104c either to or from the stowage facility, either manually or autonomously. For example, an inactive UAS 104c may be loaded to the landing platform 106a from the stowage facility 124 in anticipation of the launching of the inactive UAS 104c (e.g., as an outbound UAS 104b). Similarly, a retrieved inbound UAS 104a may be cleared from the landing platform 106a and moved to the stowage facility 124. The stowage facility 124 may include a reconfiguration mechanism 124a for adjusting the configuration of an inbound, inactive, or outbound UAS 104a-c. For example, to accommodate a stowage facility with limited space, the reconfiguration mechanism 124a may fold the wings (or other like components of the superstructure including, but not limited to, fins, rotors, control surfaces, or portions of the fuselage) of a recently arrived inactive UAS 104c to conserve space, or likewise unfold the wings or other components of an inactive UAS 104c loaded from stowage in anticipation of launch (e.g., as provided for by the flight plan of an outbound UAS 104b). The stowage facility 124 may include a vehicle service mechanism 124b for connecting or disconnecting (either manually or via a fully or partially autonomous service controller) umbilicals to the inactive UAS 104c to transfer power, fuel, and data to and from the inactive UAS 104c, e.g., to download operations and mission data collected by a retrieved UAS or to upload a revised mission plan to an inactive UAS 104c being prepared for launch. The vehicle service mechanism 124b may further provide for the loading and unloading of power and fuel modules (e.g., batteries or fuel containers) and payloads to and from the inactive UAS 104c, and assess the weight and weight distribution of both inbound and outbound UAS 104a-b.

Referring now to FIG. 2, each UAS 104a of the system 100 may include an onboard communications system 126 for exchanging data with the communications system 118 onboard the mobile platform 102 (e.g., railcars), an onboard control system 128 for managing flight operations, mission fulfillment, and the launch and retrieval mating mechanisms 130. The launch and retrieval mating mechanisms 130 may secure the UAS 104a for release from the mobile platform 102, or engage with the L/R mechanisms 106 to allow the UAS 104a to be captured and secured aboard the mobile platform by the system 100. Either the mobile platform 102 or the UAS 104a, or any of the individual components of each, may be configured for remote operation by a remotely located operator wirelessly linked to the respective communication system 118, 126; similarly, either platform or its components may be configured for autonomous operation.

Figure 3A:
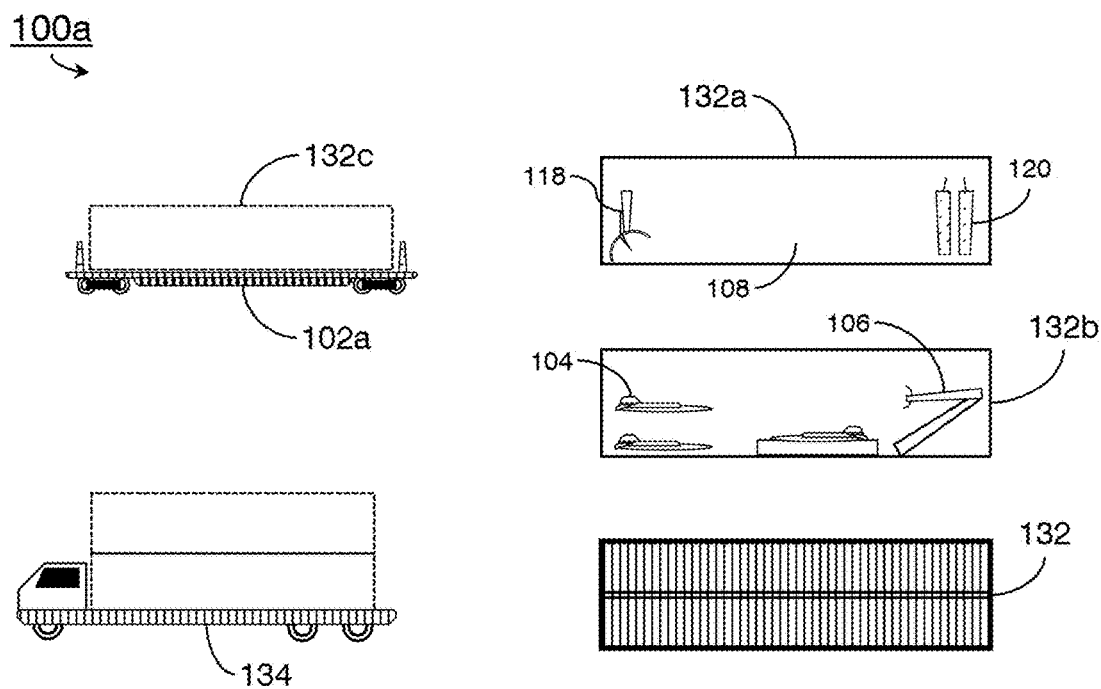
FIGS. 3A and 3B illustrate intermodal and ship-based implementations of the system of FIG. 1.

FIG. 3A—Intermodal System

Referring to FIG. 3A, the system 100a may be implemented and may function similarly to the system 100 of FIG.

1, except that the system 100a may be configured to fit inside one or more intermodal containers 132 (e.g., cargo containers) for transport to a remote location for deployment. For example, the stowage facility 124, L/R mechanisms 106, and a supply of UAS 104 may be loaded into a first intermodal container 132a; the command and control system 108, communications system 118, and wake control devices 120 may be loaded into a second intermodal container 132b. The two intermodal containers 132a-b may be transported, e.g., via truck 134 or other similar ground vehicle, to a staging area for deployment aboard flatbed railcars (102a) traversing a rail network. Alternatively, the system 100a may be embodied in appropriately sized container cars or boxcars couplable to a train for deployment. Depending on, for example, the size of the transport network, the size and capabilities of the various UAS 104, or the available resources, the system 100a may be scaled up or down as needed. For example, a rail-based network serving a short track length may be surveyed by a full system 100a transportable in a single intermodal container 132c, which container may be loaded onto a flatbed railcar 102a for transport to a staging area. Once arrived at the staging area, the flatbed railcar 102a may be decoupled from its transporting train and coupled to an operating train for deployment of the system 100a within a rail network or surrounding environment. Similarly, the system 100a may be scaled up to comprise, e.g., dozens or hundreds of intermodal containers 132 as the need demands.

Figure 3B:
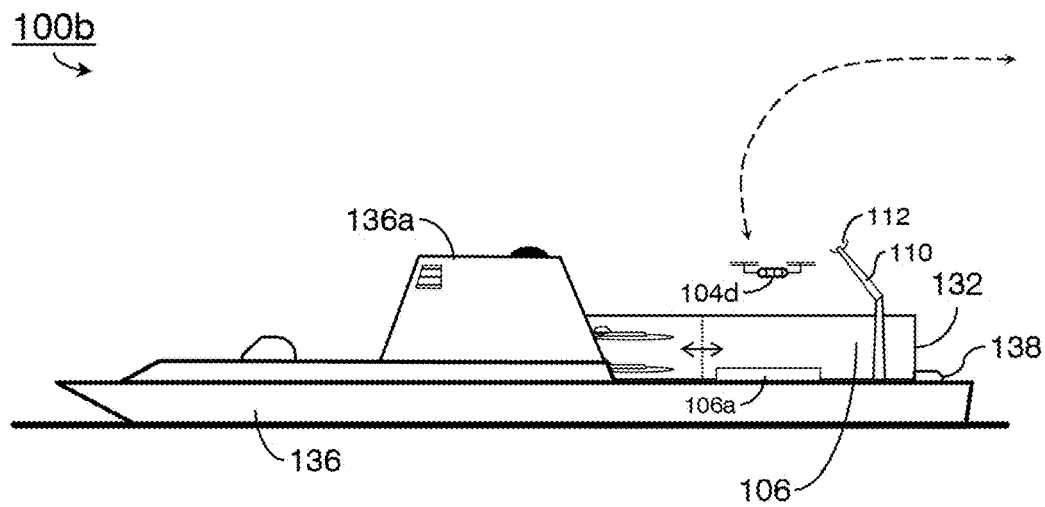

FIG. 3B—Ship-Based System

Referring to FIG. 3B, the system 100b may be implemented and may function similarly to the system 100a of FIG. 3A, except that the system 100b may be deployed aboard a ship 136 configured for seagoing, coastal, riparian, littoral, or submersible use. For example, the command and control system (108, FIG. 1), communications system (118, FIG. 1) and/or stowage facility (124, FIG. 1) may be partially or fully incorporated into a command tower 136a of the ship 136, and the L/R mechanisms 106 transported to the ship 136 via intermodal container 132 and deployed thereon. The L/R mechanisms 106 may include additional inertial sensors and motion dampeners (138) to detect and compensate for motion shifting on the part of the ship 136 that may otherwise adversely affect the ability of the robotic arm 110 and end effectors 112 to capture an inbound non-VTOL UAS (104a, FIG. 1) flying in close formation within the operating envelope of the L/R mechanisms. The L/R mechanisms 106 may, alternatively or additionally, including a launch and landing platform 106a to release and retrieve VTOL UAS 104d.

Figure 4:
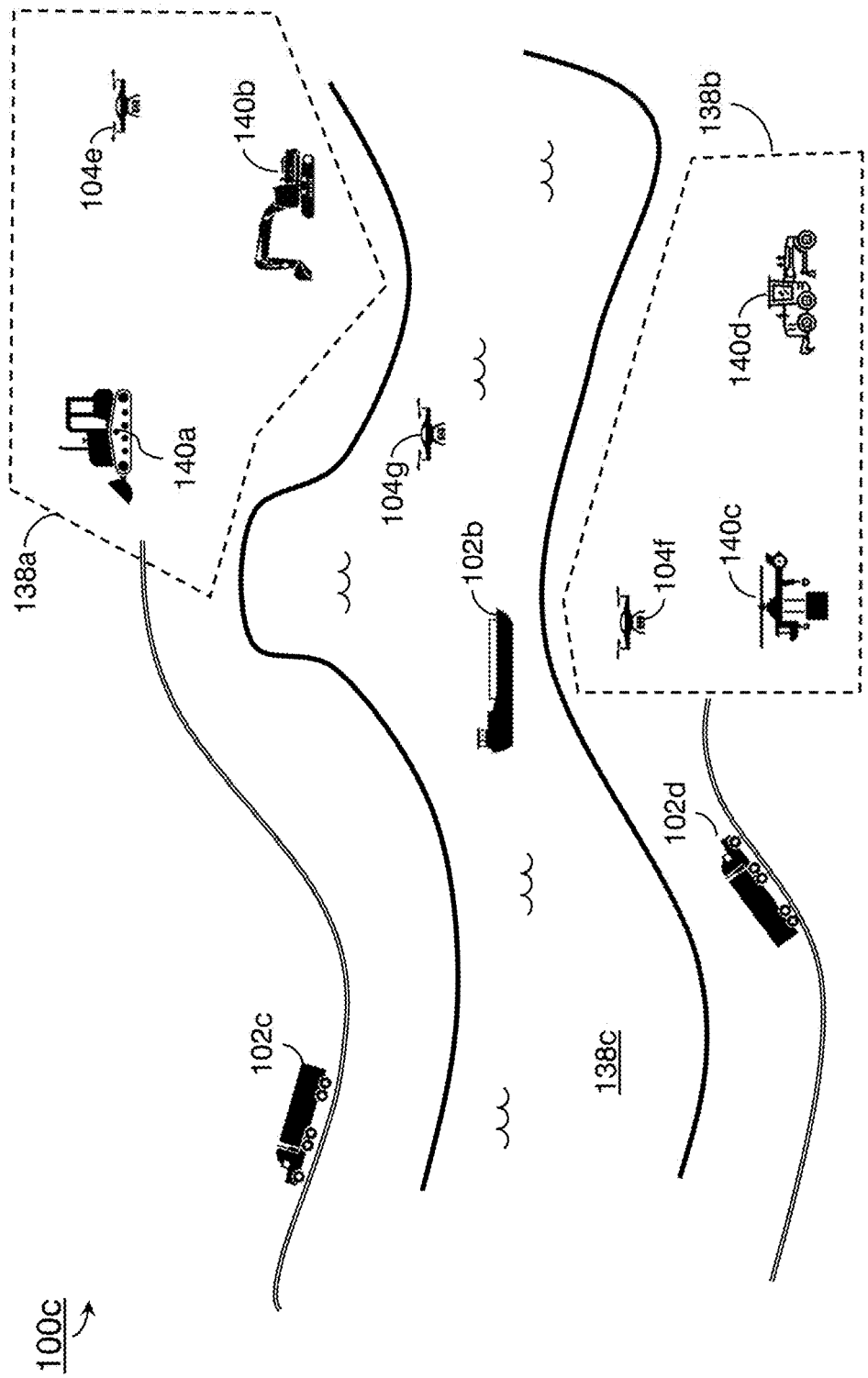
FIG. 4 illustrates a construction network implementing the system of FIG. 1.

FIG. 4—Autonomous Construction System

Referring to FIG. 4, the system 100c may be implemented and may function similarly to the system 100b of FIG. 3B, except that the system 100c may be implemented within a constrained multi-terrain environment (138a-c) involving construction operations carried out by multiple autonomous or semiautonomous ground, waterborne, and airborne vehicles. The system 100c may alternatively be deployed within the constrained multi-terrain environment 138a-b (or within an open environment) for, e.g., agricultural monitoring, fire or disaster response, underwater/submersible construction and maintenance, or environmental/resources management. Rather than the constrained multi-terrain environments 138a-b, an open environment may be defined not by fixed boundaries or parameters but, e.g., by proximity to a natural feature, manmade fixture, or an autonomous or semiautonomous vehicle of the system 100c. For example, within the environment 138a, autonomous vehicles 140a-b may be engaged in excavation operations, and within the environment 138b, autonomous vehicles 140c-d may be engaged in grading and delivery operations in preparation for the erection of a structure. The environments 138a-b may both border on a body of water 138c, on which an autonomous or semi-autonomous water-based vehicle (mobile platform 102b) may be stationed. For example, control and command components of the system 100c may be mounted on one or more of the mobile platforms 102b-d, delegating tasks and operations to their associated autonomous vehicles 140a-d depending on project demands or the individual capabilities of teach vehicle. Additional semi-autonomous or autonomous vehicles may be in transit between the respective environments 138a-b and an operations center (not shown); some of these semi-autonomous or autonomous vehicles, for example, may serve as ground-based and water-based mobile platforms 102b-d, each mobile platform carrying a set of UAS 104e-g for use within the respective environments 138a-b and fulfilling assigned mission objectives via the autonomous vehicles 140a-d assigned to each respective environment; the UAS 104e-g may provide surveillance and monitoring of mission activities, e.g., an assessment of the level grading or the progress of the excavation. If a UAS 104e-g should identify an obstacle or other hindrance, the appropriate mobile platform 102b-d may be notified to determine a solution to the problem, e.g., by deploying deforestation equipment to remove a tree or adjusting the excavation or erection project to account for the obstacle (if, for example, no such equipment is available). The mobile platforms 102b-d may communicate with each other to report progress or request equipment or services from each other; for example, the mobile platform 102c, serving environment 138a, may request the transport helicopter (140c) operating in the environment 138b served by the mobile platform 102d. Similarly, the ship-based mobile platform 102b may dispatch its UAS 104g to a predetermined position to serve as a communications relay, facilitating links between environments and system components if weather or terrain presents a challenge to normal communications. Human operators may be present on-site or remotely present, e.g., to approve decisions made by each autonomous vehicle 140a-d or mobile platform 102b-d or to monitor the system 100c, overriding autonomous components as necessary. The autonomous components of the system 100c may provide the human operator, e.g., via a control station (108a, FIG. 1), a user interface incorporating situational awareness, project completion status, conflicts in mission priorities, or aberrations and alerts associated with problems for which the autonomous components cannot provide a solution; e.g., the aforementioned obstacle may require a human demolition team to remove.

As will be appreciated from the above, systems according to embodiments of the inventive concepts disclosed herein may provide mobile and intermodal infrastructure for the support of UAS serving large transport networks where said infrastructure might not otherwise exist in a fixed form, or might be prohibitively expensive to provide and maintain. The mobile platforms may be able to launch and retrieve non-VTOL, non-hovering UAS while in motion, operating under remote control or autonomously in conjunction with mission-specific networks of autonomous machines.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. An unmanned aircraft (UA) launch and retrieval system, comprising:
 a launch and retrieval mechanism configured to be mounted to a mobile platform and associated with an operating envelope, the launch and retrieval mechanism including:
  a capture mechanism configured to engage with at least one first UA system (UAS) located within the operating envelope, the first UAS associated with flight data including one or more of a first position, a first airspeed, and a first heading; and
  a launch mechanism configured to propel at least one second UAS from the mobile platform at a second airspeed and a second heading;
 and
 a command and control system coupled to the launch and retrieval mechanism, the command and control system comprising:
  at least one sensor configured to determine one or more of a windspeed, a wind direction, and position data including one or more of a second position of the mobile platform, a third heading of the mobile platform, and a velocity of the mobile platform;
  communications equipment including one or more of
   a receiver configured to receive the flight data from the at least one first UAS; and
   a transmitter configured to send to the at least one first UAS one or more of the position data, the windspeed, and the wind direction;
  at least one control station configured to be coupled to the mobile platform, the at least one control station configured to:
   receive input from at least one operator; and
   articulate one or more of the capture mechanism and the launch mechanism based on the received input;
  the at least one control station comprising:
   a memory configured to store at least one flight plan associated with the second UAS;
   at least one processor coupled to the at least one sensor and the communications equipment, the at least one processor configured to:
    determine the second airspeed based on one or more of the position data, the flight plan, the windspeed, the wind direction, and a first weight of the at least one second UAS;
   and
   at least one display unit configured to display to the operator one or more of the position data, the flight data, the flight plan, the windspeed, and the wind direction.

2. The UA launch and retrieval system of claim 1, wherein the capture mechanism comprises:
 at least one winch configured to:
  receive at least one cable released by the first UAS; and
  direct the at least one first UAS to the mobile platform via the at least one cable.

3. The UA launch and retrieval system of claim 1, wherein:
 the capture mechanism comprises:
  a retrieval platform configured to be coupled to the mobile platform, the capture mechanism configured to secure the at least one first UAS to the retrieval platform;
 and
 the launch mechanism comprises:
  a launch platform configured to be coupled to the mobile platform.

4. The UA launch and retrieval system of claim 1, wherein the command and control system is configured to articulate the capture mechanism relative to the mobile platform based on one or more of the position data and the flight data.

5. The UA launch and retrieval system of claim 1, wherein the control station is located remotely from the command and control system and wirelessly linked to the command and control system.

6. The UA launch and retrieval system of claim 1, wherein the command and control system includes one or more of a partially autonomous system and a fully autonomous system.

7. The UA launch and retrieval system of claim 1, wherein the mobile platform is a first mobile platform, further comprising:
 at least one intermodal container configured to enclose one or more of the launch and retrieval mechanism and the command and control system for transport by a second mobile platform.

8. The UA launch and retrieval system of claim 1, wherein the at least one sensor is a first sensor and the command and control system comprises:
 at least one second sensor configured to detect one or more obstacles within the operating envelope.

9. The UA launch and retrieval system of claim 1, wherein the capture mechanism comprises:
 at least one robotic arm configured to be articulated by the command and control system, the at least one robotic arm having at least a terminal end and a base end configured to be coupled to the mobile platform; and
 one or more effectors coupled to the terminal end, the one or more effectors configured to removably attach to the at least one first UAS.

10. The UA launch and retrieval system of claim 9, wherein the one or more effectors include at least one first magnet configured to attach to at least one second magnet coupled to the first UAS.

11. The UA launch and retrieval system of claim 1, further comprising:
 at least one wake control device configured to be coupled to the mobile platform and configured to adjust airflow within the operating envelope.

12. The UA launch and retrieval system of claim 11, wherein the command and control system is configured to articulate the at least one wake control device relative to the mobile platform based one or more of the position data, the flight data, the windspeed, and the wind direction.

13. The UA launch and retrieval system of claim 1, further comprising:
at least one vehicle stowage facility configured to be coupled to the mobile platform and to the launch and retrieval mechanism, the at least one vehicle stowage facility configured to:
receive the at least one first UAS from the capture mechanism;
store the at least one first UAS in an at least partially enclosed environment; and
load the at least one second UAS from the at least partially enclosed environment to the launch mechanism.

14. The UA launch and retrieval system of claim 13, further comprising:
a reconfiguration mechanism configured to:
adjust one or more of a wing, a control surface, and a fuselage component of the at least one first UAS based on the at least partially enclosed environment; and
adjust one or more of a wing, a control surface, and a fuselage component of the at least one second UAS based on the flight plan.

15. The UA launch and retrieval system of claim 13, wherein the vehicle stowage facility includes a vehicle service mechanism configured to:
removably attach to one or more of the at least one first UAS and the at least one second UAS one or more of a power umbilical, a fuel umbilical, and a data umbilical coupled to the at least one processor;
replace one or more of a battery of the at least one first UAS, a data storage unit of the at least one first UAS, a fuel container of the at least one first UAS, and a payload of the at least one first UAS; and
determine at least one of the first weight, a second weight associated with the at least one first UAS and a weight distribution associated with one or more of the at least one first UAS and the at least one second UAS.

16. An unmanned aircraft (UA) launch and retrieval system for operation within a ground-based transportation network, the system comprising:
at least one mobile platform configured to traverse a transport corridor;
a launch and retrieval mechanism coupled to the mobile platform and associated with an operating envelope, the launch and retrieval mechanism comprising
a capture mechanism configured to engage with at least one first UA system (UAS) located within the operating envelope, the first UAS associated with flight data including one or more of a first position, a first heading, and a first airspeed;
a launch mechanism configured to propel at least one second UAS from the mobile platform at a second airspeed and a second heading;
a command and control system coupled to the launch and retrieval mechanism, the command and control system comprising:
one or more sensors including at least:
a first sensor configured to determine one or more of a windspeed, a wind direction, and position data including one or more of a velocity of the mobile platform, a second position of the mobile platform, and a third heading of the mobile platform; and
a second sensor configured to detect an obstacle within the operating envelope;
communications equipment coupled to the one or more sensors and including one or more of a receiver configured to receive the flight data from the at least one first UAS and a transmitter configured to send to the at least one first UAS one or more of the position data, the windspeed, and the wind direction;
at least one control station coupled to the one or more sensors and the communications equipment, the at least one control station configured to receive input from at least one operator and articulate one or more of the capture mechanism and the launch mechanism based on the received input, the at least one control station comprising:
a memory configured to store a flight plan associated with the at least one second UAS;
at least one processor coupled to the one or more sensors and the communications equipment, the at least one processor configured to 1) determine the second airspeed based on one or more of the position data, the flight plan, the windspeed, the wind direction, and a second weight of the at least one second UAS and 2) modify the flight plan based on the received input; and
at least one display unit configured to display to the at least one operator one or more of the position data, the flight data, the flight plan, the windspeed, and the wind direction.

17. The UA launch and retrieval system of claim 16, wherein the ground-based transportation network is a rail network and the at least one mobile platform includes one or more of a flat car, a container car, and a boxcar.

18. The UA launch and retrieval system of claim 16, further comprising:
at least one vehicle stowage facility configured to be coupled to the mobile platform and to the launch and retrieval mechanism, the at least one vehicle stowage facility configured to:
store one or more of the at least one first UAS and the at least one second UAS in an at least partially enclosed environment;
receive the at least one first UAS from the capture mechanism; and
load the at least one second UAS from the at least partially enclosed environment to the launch mechanism.

19. An unmanned aircraft (UA) launch and retrieval system, the system comprising:
one or more intermodal containers configured to:
be removably mounted to at least one mobile platform; and
at least one of contain and partially enclose a launch and retrieval mechanism, and at least one of a command and control system and a wake control device;
the launch and retrieval mechanism associated with an operating envelope and comprising:
a capture mechanism configured to engage with at least one first UA system (UAS) traveling within the operating envelope at one or more of a first heading and a first airspeed;

a launch mechanism configured to propel at least one second UAS from the at least one mobile platform at one or more of a second heading and a second airspeed;

the command and control system configured to be coupled to the launch and retrieval mechanism and comprising:

at least one sensor configured to determine one or more of a windspeed, a wind direction, and position data including at least one of a velocity of the mobile platform, a position of the mobile platform, and a third heading of the mobile platform;

communications equipment comprising:

a receiver configured to receive from the at least one first UAS one or more of the first heading and the first airspeed; and a transmitter configured to send to the at least one first UAS one or more of the position data, the windspeed, and the wind direction; and at least one control station configured to receive input from at least one operator, the at least one control station comprising:

a memory configured to store a flight plan associated with the at least one second UAS;

at least one processor coupled to the at least one sensor and the communications equipment, the at least one processor configured to 1) determine the second airspeed based on one or more of the position data, the flight plan, the windspeed, the wind direction, and a second weight of the at least one second UAS and 2) modify the at least one flight plan based on the received input; and at least one display unit configured to display to the at least one operator one or more of the position data, the flight data, the flight plan, the windspeed, and the wind direction.

20. The UA launch and retrieval system of claim 19, wherein the one or more intermodal containers are removably mounted to the at least one mobile platform for operations within a transportation network associated with the at least one mobile platform via the at least one first UAS and the at least one second UAS.

\* \* \* \* \*